United States Patent
Ebner et al.

(10) Patent No.: US 6,594,718 B1
(45) Date of Patent: Jul. 15, 2003

(54) ARBITRATION SCHEME FOR EQUITABLE DISTRIBUTION OF BANDWIDTH FOR AGENTS WITH DIFFERENT BANDWIDTH REQUIREMENTS

(75) Inventors: Sharon M. Ebner, Mountain View, CA (US); Debendra Das Sharma, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/562,586

(22) Filed: Apr. 29, 2000

(51) Int. Cl.$^7$ ................................................ G06F 13/14
(52) U.S. Cl. ........................ 710/240; 710/107; 710/124
(58) Field of Search .................................. 710/107, 124, 710/117, 240, 241; 370/458, 442, 461, 468, 400, 450; 711/151; 345/535

(56) References Cited

U.S. PATENT DOCUMENTS

| | | | | |
|---|---|---|---|---|
| 5,570,355 A | * | 10/1996 | Dail et al. | |
| 5,818,830 A | * | 10/1998 | Daane et al. | |
| 5,951,664 A | * | 9/1999 | Lambrecht et al. | |
| 5,982,780 A | * | 11/1999 | Bohm et al. | |
| 6,091,740 A | * | 7/2000 | Karasawa | |
| 6,400,410 B1 | * | 6/2002 | Timmer et al. | |

* cited by examiner

Primary Examiner—Gopal C. Ray

(57) ABSTRACT

A device for arbitrating access to a resource by a plurality of agents includes logic configured to associate requesting ones of the agents with access tokens. The number of the access tokens assigned to each requesting agent is proportional to its bandwidth or speed in comparison with the other requesting agents. A is selector configured to sequence through the access tokens and select respective ones of the requesting agents associated with the access tokens. The logic may dynamically reconfigure token allocation and distribution to only those agents having a pending service request or may skip tokens allocated to agents not having a pending request. The distribution of tokens is preferably uniform over the total bandwidth space of the agents or requesting agents. In one implementation tokens are in the form of binary numbers.

14 Claims, 5 Drawing Sheets

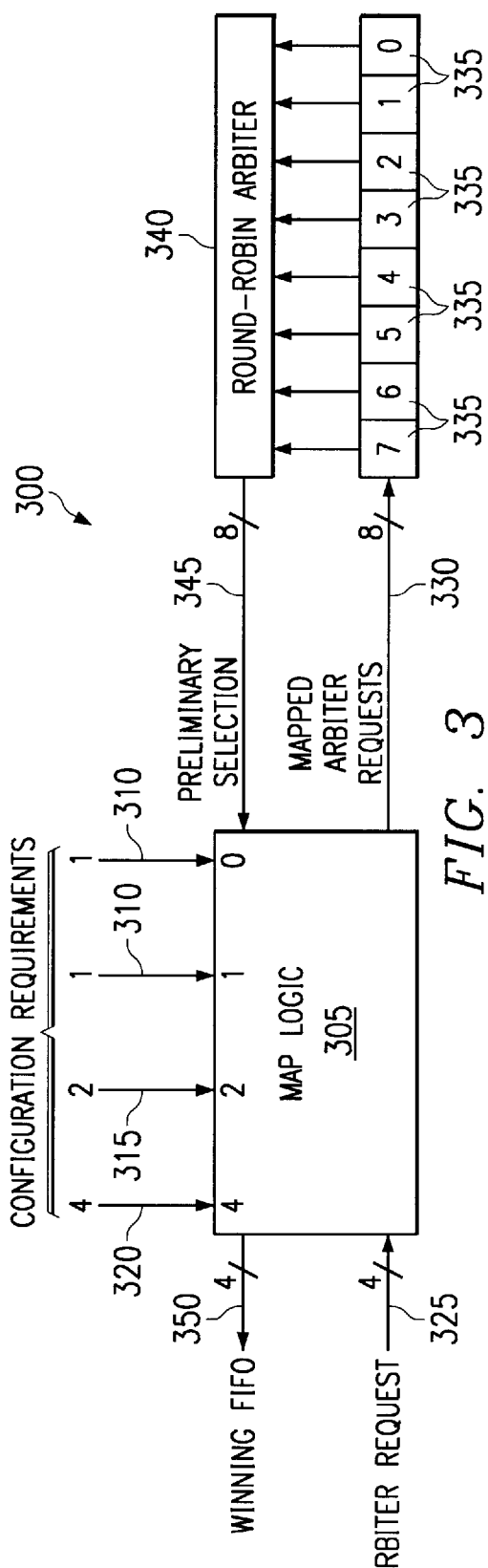
FIG. 3
| ORIGINAL CYCLES | BINARY EQUIVALENT | MAT CYCLE |
|---|---|---|
| 0 | 0 0 0 | 0 |
| 1 | 0 0 1 | 4 |
| 2 | 0 1 0 | 2 |
| 3 | 0 1 1 | 6 |
| 4 | 1 0 0 | 1 |
| 5 | 1 0 1 | 5 |
| 6 | 1 1 0 | 3 |
| 7 | 1 1 1 | 7 |
FIG. 4
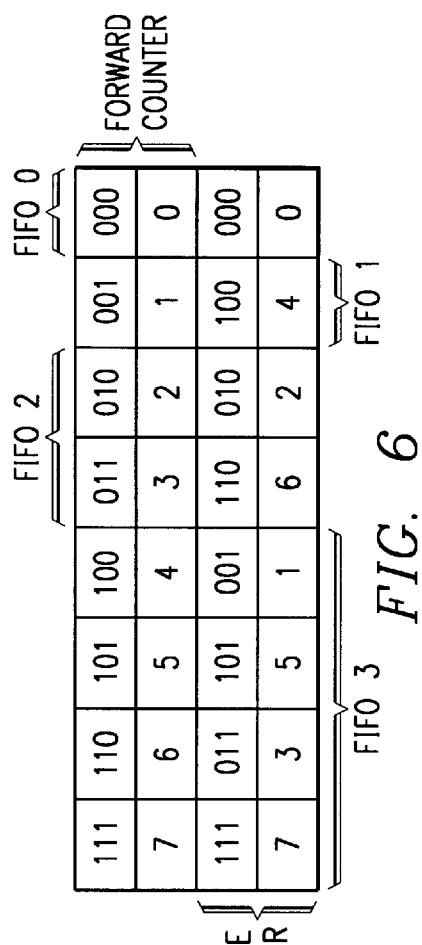
FIG. 6

ARBITRATION SCHEME FOR EQUITABLE DISTRIBUTION OF BANDWIDTH FOR AGENTS WITH DIFFERENT BANDWIDTH REQUIREMENTS

BACKGROUND

In computer systems, single resources are shared between competing multiple agents through arbitration algorithms that ensure that each of the agents has equitable access to the single resource. For example, if four comparable agents required access to a single device or resource, one arbitration algorithm might ensure that each agent had access to the single device, or resource, 25% of the time. A common arbitration scheme uses a round robin. In a round robin arbitration each of the multiple agents is given equal priority in the arbitration and the round robin arbitration algorithm cycles in a fixed order through the multiple agents that are competing for the resource. Typically, the successful agent is chosen through numerically increasing order. In a specific arbitration cycle, the reference number of a selected agent is stored and then, during the next arbitration window, the next highest agent number is selected. For example, if eight agents request access to a single device or resource, this scheme would assign the competitive agents reference numbers 0 through agent 7 respectively. If the requested device or resource had most recently been accessed by agent 0, this value would be stored and in the succeeding cycle, agent 1 would have exclusive use of the device or resource.

While each competing agent has equal priority for the single resource and receives a pro-rata allotment for accessing the resource, such equal distribution of time slots and periods between multiple agents does not readily adapt to competing agents having different bandwidth requirements or speed capabilities. For example, if one agent operates at a speed such that it requires a resource twice as often as a second agent, this technology makes no provision for these greater requirements. Instead, using the round robin arbitration described, both agents would win the arbitration equally often and each would have equal access to the single resource even though one agent requires the resource twice as often as the other agent. This mismatch between the agent's bandwidth capabilities and its access to the shared resource impairs overall efficiency.

For example, in a computer system there are often many input/output (I/O) devices which have different bandwidth requirements. A system that supports different speeds of peripheral component interface (PCI) buses, may have cards which utilize data at different speeds. While the following description uses a PCI bus, the invention is not limited to any particular type of bus architecture. Some cards on a PCI bus may run at 33 MHZ while other cards run at 66 MHZ. Assuming an identical number of bits of data used by the two cards, the 66 MHZ card will use data twice as fast as the 33 MHZ card. The PCI card that runs at 33 MHZ are designated as 2X PCI bus cards. These cards use 64 bits of data. Conversely, the PCI bus cards that run at 66 MHZ are designated 4X PCI bus cards and also use 64 bits of data. A third speed of bus card is available which doubles the bandwidth of the 4X PCI bus cards and is designated the 8X PCI bus cards. The 8X PCI bus cards runs at double the bandwidth. If a 2X PCI bus card, a 4X PCI bus card, and an 8X PCI bus card were all configured with a standard round robin arbitration, the three speed cards would be given equal priority for the single resource. However, because of the greater data rates, the 4X PCI bus card and the 8X PCI bus cards are not being used efficiently in this round robin arbitration between the cards of various speeds and bandwidth.

Arbitration schemes have attempted to address this mismatch between high speed agents by devoting additional resource access periods to the higher speed agents. For instance, if an 8 cycle access period is divided between two 2X PCI bus cards (2X PCI#1 and 2X PCI#2), and a single 4X PCI card (4X PCI) a standard round robin arbitration scheme would allow each agent to access the resource ⅓ of the time. However, prior arbitration schemes have attempted to give the 4X PCI card twice as much access to the resource then either of the two 2X PCI cards. In an 8 cycle access period, access to the resource could be divided as follows: cycle 0–2X PCI#1; cycle 1–2X PCI#2; cycle 2–4X PCI; cycle 3–4X PCI; cycle 4–2X PCI#1; cycle 5–2X PCI#2; cycle 6–4X PCI and cycle 7–4X PCI.

While this division of the resource among competing agents does lessen the problem, other difficulties are encountered. First, during the cycles in which 4X PCI card has exclusive access to the resource, both the 2X PCI#1 and 2X PCI#2 are deprived of access to the resource. Unless both 2X PCI bus cards have stored enough data to continue processing during that time, the overall efficiency of the system is reduced. Secondly, buffers associated with the 2X PCI bus cards may have to be increased to ensure their access to data during the excluded cycles. These problems are only exacerbated when an 8X PCI bus card is included within the system and increasingly the bandwidth mismatch. In addition, the startup time is delayed for the 2X device if the 4X of 8X card is selected first.

A need therefore exists for an efficient arbitration scheme which accommodates multiple speeds of the competing agents and which efficiently distributes access to the resource in accordance with the various speeds of the competing multiple agents. A further need exists for an efficient arbitration scheme that distributes access to the resource among the multiple agents in an efficient manner, allowing each of the competing agents to effectively use the single resource.

SUMMARY OF THE INVENTION

These and other objects, features and technical advantages are achieved by a system and method which according to one aspect of the invention, includes a device for arbitrating access to a resource by a plurality of agents includes logic configures to associate requesting ones of the agents with access tokens. The number of the access tokens assigned to each requesting agent is proportional to its bandwidth or speed in comparison with the other requesting agents. A selector is configured to sequence through the access tokens and select respective ones of the requesting agents associated with the access tokens. The logic may dynamically reconfigure token allocation and distribution to only those agents having a pending service request or may skip tokens allocated to agents not having a pending request. The distribution of tokens is preferably uniform over the total bandwidth space of the agents or requesting agents. In one implementation tokens are in the form of binary numbers. Sequencing through the binary numbers may be based on a reversal of the bits of the numbers or selection of winning agents may be based on a reversal of the bits.

According to another aspect of the invention, a method of arbitrating access to a resource by a plurality of agents associates requesting ones of the agents with access tokens. Numbers of access tokens are associated with each of the requesting agents in proportion to that agent's bandwidth capabilities and/or requirements with respect to the total bandwidth of all agents. The access tokens are sequenced through and respective ones of the requesting agents are selecting in response to selection of one of its tokens. The method may further include dynamically allocating the access tokens to the requesting ones of the agents and/or skipping selection of nonrequesting ones of the agents in response to an arbitration request. The tokens may be binary numbers wherein the selecting step sequences through the token in a reverse bit sequence order. Selection of agents may be based on a reverse bit sequence order of the binary numbers. The tokens associated with a particular agent may be uniformly distributed amongst all of the tokens.

According to another aspect of the invention, a device equitably arbitrates access to a resource by a plurality of agents such as DMA by a plurality of I/O devices, memory access by plural processors, etc. The invention includes methods and structures to equitably distribute access to resources based on the bandwidth of the requesting device relative to the bandwidth of other requesting devices (i.e., the normalized bandwidth (or speed) of the device). An even distribution may be accomplished using a variety of techniques, including bit reversal of an appropriate sequence of binary numbers, use of a hash function, use of a pseudo-random number generator to spread requests evenly over a large number space, etc.

According to one implementation, the invention includes map logic, a clock and a selector. The map logic defines a plurality of consecutive time slots equal in number to a total normalized bandwidth requirement of the agents, each of the agents assigned a number of time slots proportionate to its own bandwidth requirements. A selector is responsive to a clock for sequencing through the time slots and selecting respective requesting ones of the agents assigned to the time slots.

According to a feature of the invention, the clock may be in the form of a counter providing a repeating sequence of values. The sequence may repeat in correspondence to a total number of time slots defined by the map logic.

According to another feature of the invention, the map logic evenly distributes the time slots assigned to respective ones of the agents over a total number of the consecutive time slots.

According to a still further feature of the invention, each of the time slots is identified by a corresponding one of a monotonically increasing sequence of binary numbers and the map logic maps each of the binary numbers to a target binary number formed by reversing a bit order thereof.

According to a still further feature of the invention, each of the agents is assigned a consecutive sequence of binary numbers starting with a integer multiple of its normalized bandwidth. For example, a device operating at a bandwidth four times that of a slowest device may be assigned four time slots corresponding to a forward binary sequence beginning at 0, 4, 8 or 12 ($C_{hex}$) and including the next three binary numbers. When reversed, the sequence evenly distributes the assignments to this device over the entire space of, in this example, sixteen possible slots. Time slots assigned to devices or processes not requesting service and unassigned time slots may be skipped or excluded.

According to a still further feature of the invention, each of the agents is assigned a consecutive sequence of binary numbers having a minimized distance between the most significant bits thereof weighted from most to least significant. Thus such that a sequences of binary values associated with a particular agent begins on bit transition boundary minimizing transitions of the most significant bit through the next most significant bit of the series.

According to another feature of the invention, each of the agents is associated with a set of binary numbers corresponding to values obtained by reversing a bit order of respective ones of non-overlapping consecutive sequences of binary numbers, each of the sequences spanning a range proportionate to a bandwidth requirement of respective ones of the agents.

According to another feature of the invention, each of the agents is associated with a set of binary numbers included within respective non-overlapping consecutive sequences of binary numbers, each of the sequences spanning a range proportionate to a bandwidth requirement of respective ones of the agents.

According to another aspect of the invention, a method of arbitrating access to a resource by a plurality of agents includes defining a plurality of consecutive time slots, a number of the time slots assigned to respective ones of the agents in proportion to respective bandwidth parameters thereof. The time slots are then periodically sequenced through and respective ones of the agents assigned to the time slots are selected. Preferably, ones of the time slots assigned to respective ones of the agents are evenly distributed among all of the time slots.

According to a feature of the method, each of the time slots is identified by a corresponding one of a monotonically increasing sequence of binary numbers and the map logic maps each of the binary numbers to a target binary number formed by reversing a bit order thereof.

According to another feature of the inventive method, each of the agents is associated with a consecutive sequence of binary numbers having a minimized distance between the most significant bits thereof According to another feature, each of the agents is associated with a set of binary numbers corresponding to values obtained by reversing a bit order of respective ones of non-overlapping consecutive sequences of binary numbers, each of the sequences spanning a range proportionate to a bandwidth requirement of respective ones of the agents. Another feature includes associating each of the agents with a set of binary numbers included within respective non-overlapping consecutive sequences of binary numbers, each of the sequences spanning a range proportionate to a bandwidth requirement of respective ones of the agents.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 3 shows a preferred embodiment of an efficient arbitration scheme;

FIG. 4 is a table used to determine the cycle sequence;

FIG. 6 is a table illustrating a time slot distribution achieved using binary number bit reversal applied to four FIFO agents;

DETAILED DESCRIPTION

Figure 1:
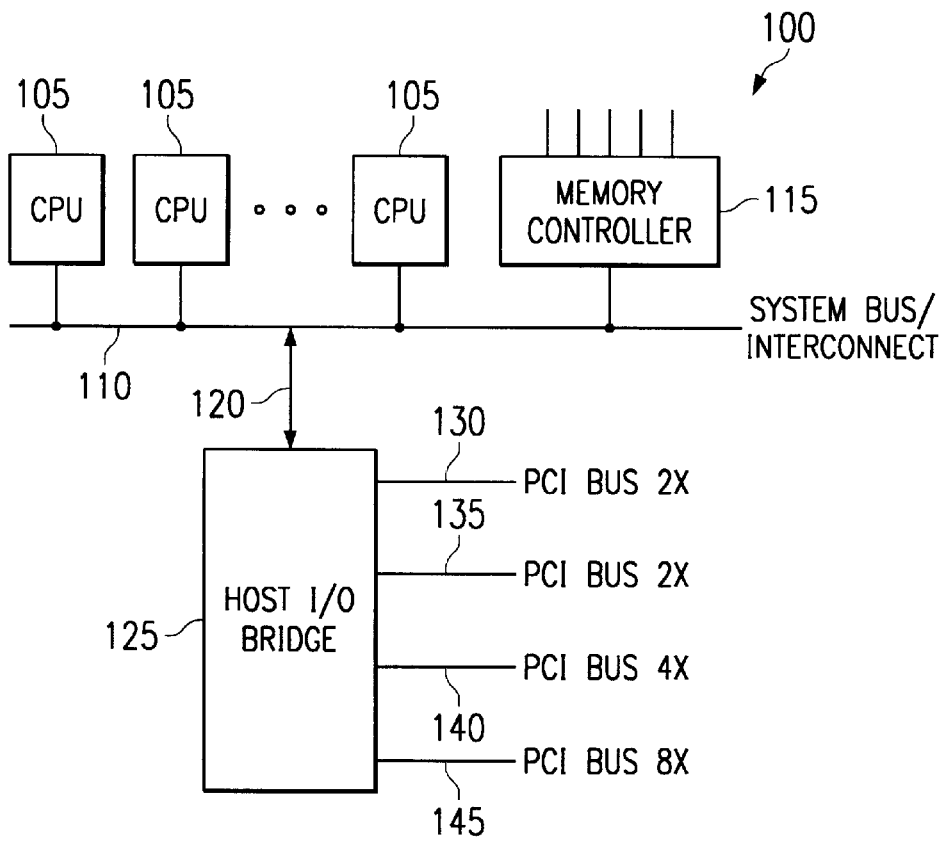
FIG. 1 shows a block diagram consisting of central processing units, a memory controller, a host I/O bridge and four attached PCI bus cards.

FIG. 1 illustrates a system 100 which is composed of a number of central processing units (CPU) 105 interconnected through a system bus/interconnect 110. Also connected to the system bus 110 is memory controller 115. Host I/O bridge 125 is also connected to the system bus 110 by link 120. The host I/O bridge 125 interfaces a number of PCI buses of various speeds to system 100. Connected to the host I/O bridge 125 is a 2X PCI bus 130, a second 2X PCI bus 135, a 4X PCI bus 140 and a 8X PCI bus 145. The 8X PCI bus is twice as fast as the 4X PCI bus which, in turn, is twice as fast as the PCI bus 2X. If a round robin arbitration algorithm were used with system 100 and the round robin arbitration algorithm gave equal priority to each of the PCI buses 130, 135, 140 and 145 connected to the host I/O bridge 125, the system would not be used as efficiently as possible. The bandwidth requirements for the 2X PCI bus 130 is 264 MB/sec. The bandwidth requirements for the 4X PCI bus 140 is 528 MB/sec and the bandwidth requirement for the 8X PCI bus is 1,056 MB/sec. Thus, the 8X PCI bus 145 requires four times the amount of data when fully operational than does 2X PCI bus.

Figure 2:
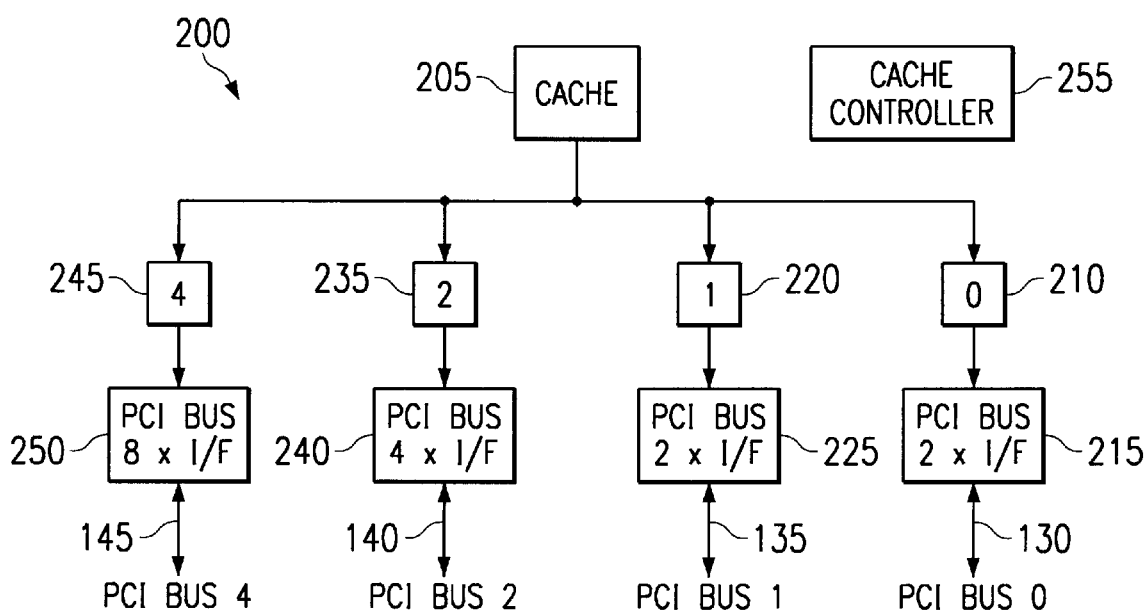
FIG. 2 shows a block diagram of the interconnections between the PCI bus cards and the cache.

Still referring to FIG. 1 if the 4 PCI buses are the multiple agents competing for the single resource memory controller 115 an arbitration algorithm would determine which PCI bus has access to the memory controller at a specific time. System 200 in FIG. 2 shows a detailed block diagram of the interface between the various PCI buses and the memory cache 205. The memory cache 205 is connected to the PCI bus No. 0 130 through port 0 210 and a 2X PCI bus interface 215. Similarly, the cache 205 is connected to the PCI bus No. 1 135 through port 1 220 and the 2X PCI bus interface 225. The cache 205 is connected to the PCI bus No. 2 140 through port 2 235 and the 4X PCI bus interface 240. Finally the cache 205 is connected to the PCI bus No. 4 145 through port 4 245 and the 8X PCI bus interface 250. A cache controller 255 determines which of the multiple agents will have access to the single resource cache 205 at a specific time.

System 300 of FIG. 3 shows the preferred embodiment of the invention. If four PCI bus cards are connected to the system, an 8X PCI card, 4X PCI card, and two 2X PCI cards, information concerning the bandwidth requirements of these cards would be accessible to the map logic 305 of FIG. 3 through dedicated lines. For the two 2X PCI cards, a value of 1 on line 310 would be sent to the map logic. For the 4X PCI card a value of 2, meaning twice as fast as a 2X PCI card, would be entered through line 315 and be available to the map logic, 305. For the 8X PCI card a value of 4 would be sent to the map logic via line 320. The value of 4 indicates the 8X PCI card is four times faster than the 2X PCI card.

The map logic block 305 would then analyze the bandwidth or configuration requirements to determine the number of bits required for each PCI bus cards. Referring to FIG. 4, the map logic block 305 of FIG. 3 determines the number of cycles to be dedicated to each of the PCI bus cards by their bandwidth requirements. For a 4X PCI card, the map logic 305 of FIG. 3 will assign two cycles for each 4X PCI card. These cycles must be sequential. So for a single 4X PCI card map logic controller 305 of FIG. 3 may assign cycles 0 and 1, or cycles 2 and 3, or cycles 4 and 5, or cycles 6 and 7. For an 8X PCI bus card, map logic controller 305 of FIG. 3 will assign four cycles to the associated 8X PCI bus card. Map logic controller 305 of FIG. 3 can assign cycles 0, 1, 2 and 3 to this 8X PCI bus card; or cycles 4, 5, 6 and 7 to the 8X PCI bus card.

Additionally, FIG. 4 shows the cycle sequence which will be used for the round robin arbitrator. The sequence is obtained by reading into the binary designation for the decimal number from right to left rather than from left to right. This assumes a total number of binary designations must be a power of 2, i.e., 2, 4, 8, 16, etc. For instance, for the decimal number 0 the binary designation would be 000 from left to right. Reading the same designation from right to left, it is still 000 which indicates this is going to be cycle 0. Similarly for the decimal number 1 the binary designation is 001, going from left to right. Reading the same decimal value from right to left gives a value of 100 which is cycle 4. The binary value for 2 is 010 which is identical when it is read from right to left or left to right. So the cycle for this value is 2. For the decimal number 3 the binary value is 011. When reading this binary value from right to left it ends up being 110 or 6. The third column of FIG. 4 shows the sequence in which the cycles are read. This sequence is 0, 4, 2, 6, 1, 5, 3 and 7.

The map logic spreads the access of a PCI bus card over the eight cycles. As previously discussed an 8X PCI bus card would have access to the resource on either cycles 0, 1, 2 and 3 or on cycles 4, 5, 6 and 7. If an 8X PCI bus card had access to the single resource on cycles 0, 1, 2 or 3 originally, the map logic controller 305 of FIG. 3, using the method explained by FIG. 4 would allow the 8X PCI bus card to access the single resource on the resulting cycles 0, 4, 2 and 6. Alternatively, if the same 8X PCI bus card had access to the single resource originally on cycles 4, 5, 6 and 7, FIG. 4 shows that the resulting cycles for the access for this 8X PCI card would be 1, 5, 3 and 7. Effectively, the 8X PCI card uses the resource every other cycle.

Similarly, a 4X PCI card, according to FIG. 4, has access to the single device or resource on the original cycles 0 and 1, would have access to the same single device or resource on the resulting cycles 0 and 4. The map logic controller 305 of FIG. 3 therefore spreads the agent's access across the eight cycles.

Referring back to FIG. 3, when an arbitration request comes in across line 325, the map logic has already mapped access to the specific PCI bus cards to a specific cycle. This results in a mapped arbitration request which is sent across line 330 to the arbitration bits 335. The round robin arbitrator 340, is a standard round robin arbitrator which is now fed data in a manner which causes it to allow access to the PCI bus cards in accordance with their bandwidth requirements. The resulting access map, or preliminary selection map is sent across line 345 back to the map logic which sends out the winning first in/first out (FIFO) access on line 350.

Equitable distribution of agents requesting arbitration among all other requesting agents is based on providing a number or accesses opportunities in proportion to the normalized bandwidth of a requesting device relative to the other requesting agents. These opportunities may be evenly distributed using a variety of techniques including, but not limited to, reversal of bits of a binary sequence of numbers, use of a hash function or a pseudo-random number generator, etc. The distribution achieved by the first technique is illustrated in FIG. 5.

Figure 5:
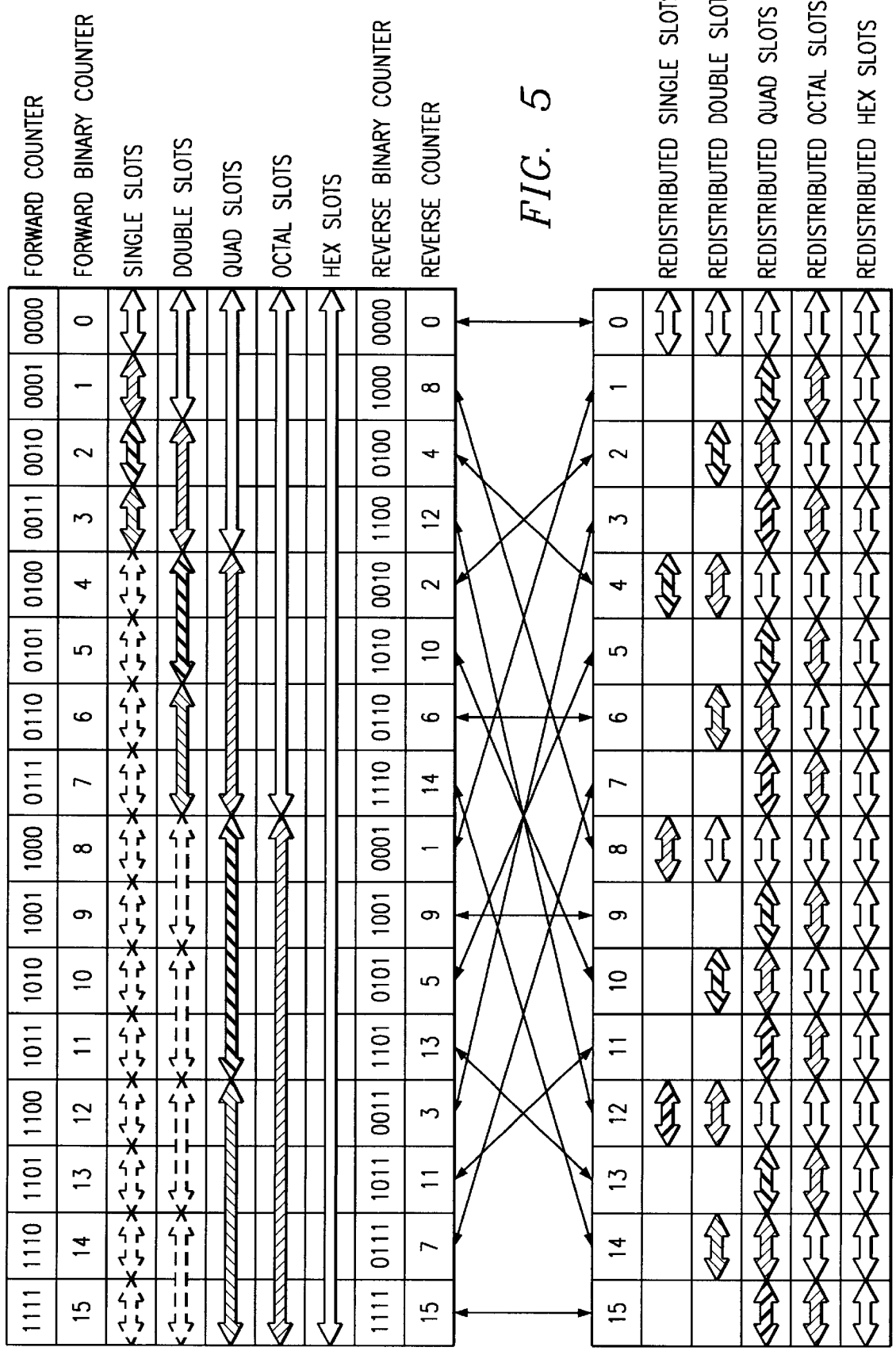
FIG. 5 is a diagram illustrating time slot distribution achieved by bit reversal of a sequence of sixteen binary numbers.

Referring to FIG. 5, the top table includes column headers corresponding to a normal, right to left interpretation of a binary number wherein the rightmost bit is the least significant (i.e., $2^0$), the remaining bits representing increasing powers of two proceeding to the left. The corresponding decimal number equivalent of these "forward" binary numbers are shown immediately below.

Once the sum of all of the agent's normalized bandwidth requirements is calculated, a corresponding maximum binary value is found. For example, if seven devices have normalized bandwidths of 4, 4, 2, 2, 2, 1 and 1, respectively, a total of up to sixteen access opportunities or time slots may be needed. Each of the devices would be assigned a set of consecutive binary number values starting at a multiple of the normalized bandwidth requirement for each device. Preferably, high bandwidth devices are assigned first since their assignment is the most restrictive. Following these rules, permissible ranges or sequences of binary numbers for binary multiples of a normalized bandwidth requirement are shown by the horizontal arrows in the upper table. Up to the first four time slots in each row is distinguished by a unique arrow shading so as to provide a correspondence with the redistributed time slot sequence in the lower table. This redistribution is accomplished by a reversed reading of the associated binary numbers so as to remap the entries as illustrated by the arrows connecting the tables.

For example, referring to the tables, in a system including a total normalized bandwidth requirement of 16, an agent or device having a normalized bandwidth of 1 can be assigned any of the slots represented by the table row labeled "Single Slots", while an agent having a normalized bandwidth of 2 should only be assigned consecutive sequences of two binary numbers starting on an integer multiple of that bandwidth, i.e., 0, 2, 4, 6, 8, 10, 12 and 14 as shown by the arrows in the row labeled "Double Slots". Reversing the bit sequence of the assigned slots results in the consecutive binary values being evenly redistributed as shown in the lower table of FIG. 5. For example, referring to the first, solid arrow spanning binary values 0000 through 0011 in the "Quad Slots" row of the upper table, a reversed reading of the bits results in a mapping into the slots indicated by the four solid arrows in the row labeled "Redistributed Quad Slots" in the lower table, i.e., slots 0, 4, 8 and 12.

Figure 7A:
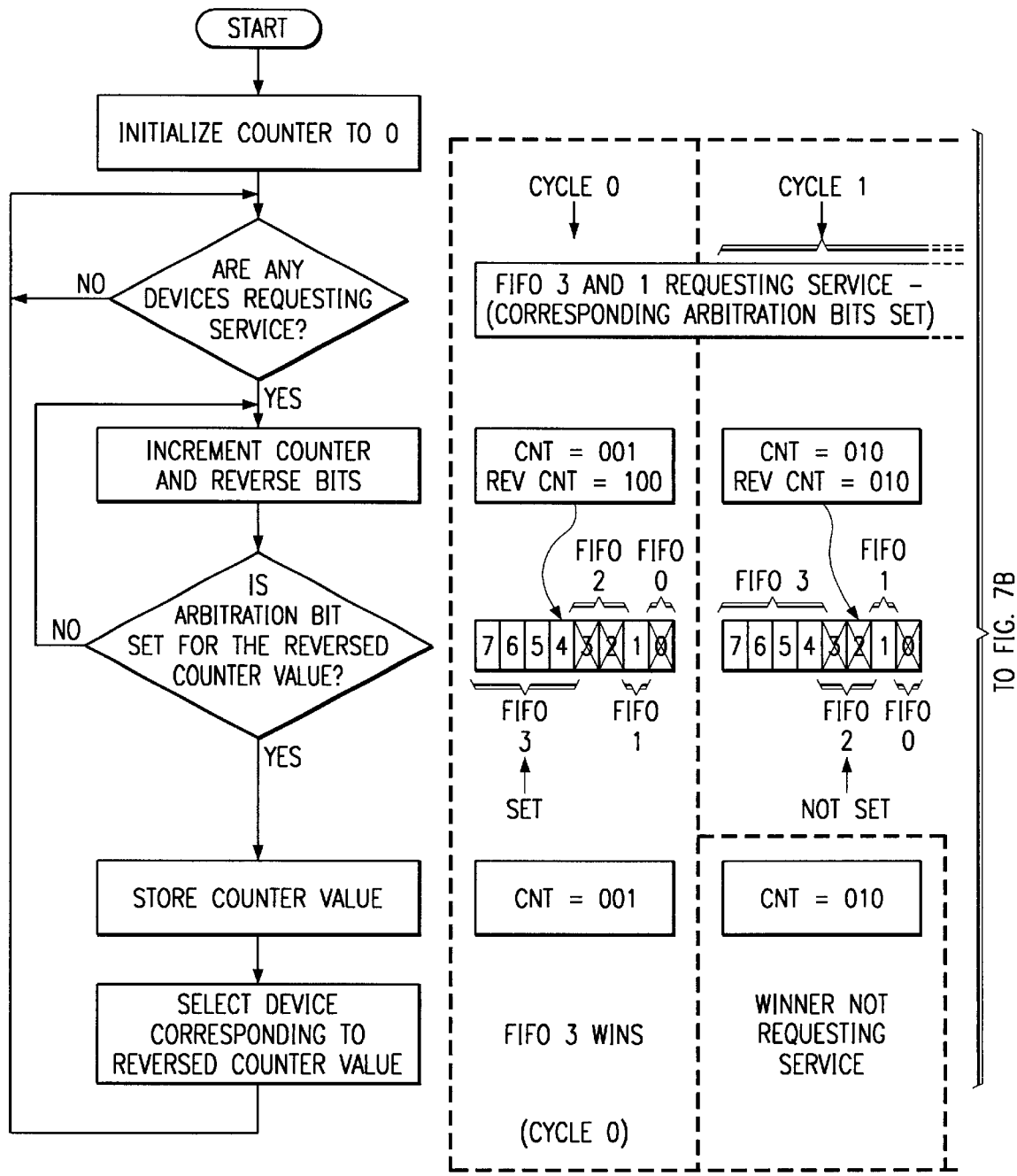
FIGS. 7A and 7B is a flow chart with accompanying walk-through values and outputs.
Figure 7B:
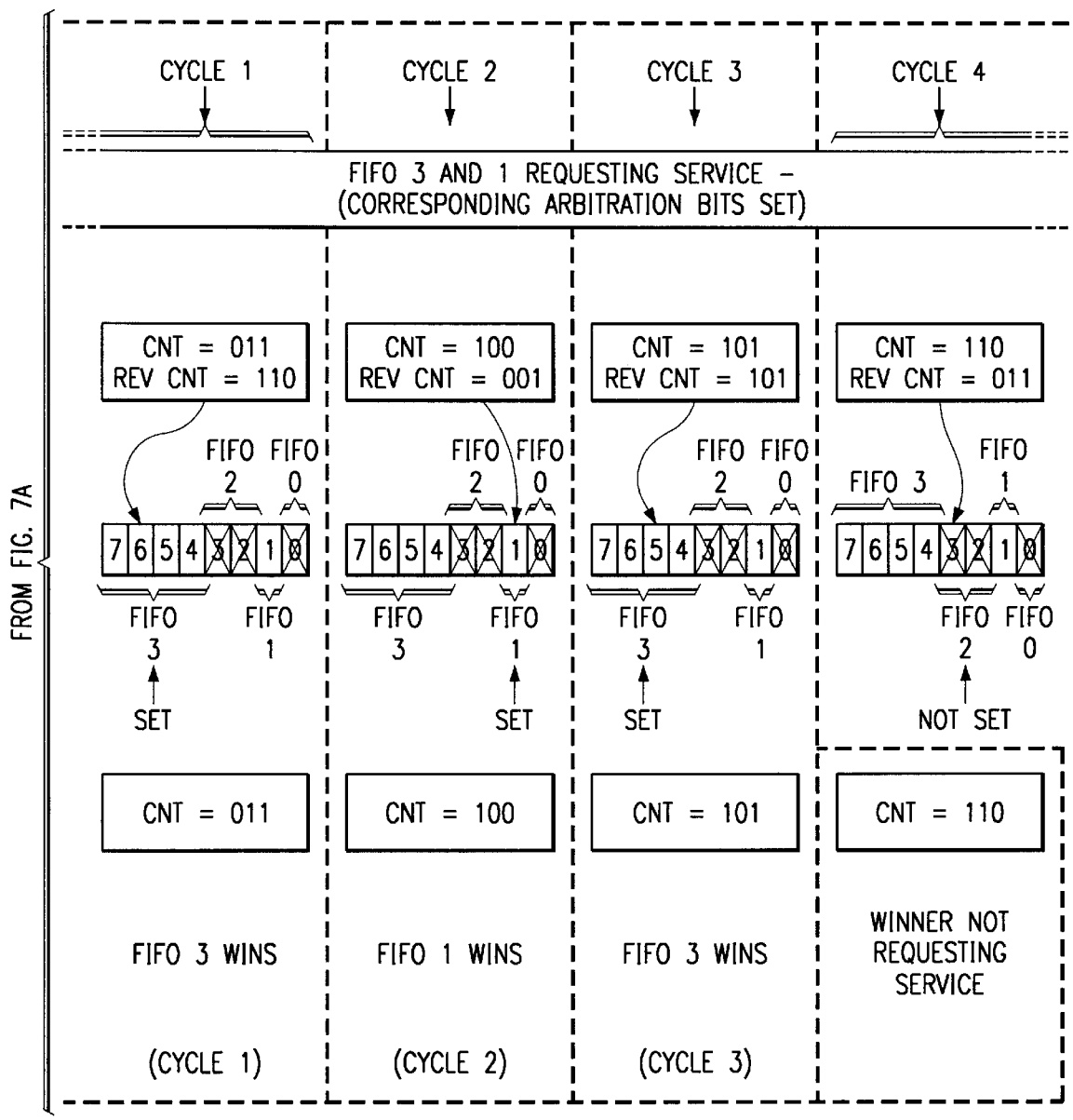

A further example of an embodiment of the invention using the reversal of binary bits techniques is shown in FIGS. 6 and 7. FIG. 6 illustrates a possible assignment of four agents, FIFO 0 through FIFO 3 to sequences of binary numbers corresponding to their respective normalized bandwidth requirements. Thus, if FIFO 0 through FIFO 3 are 2X, 2X, 4X and 8X, respectively, FIFO 3 would be assigned to a sequence of four binary values, FIFO 2 is assigned two slots, and FIFO 1 and FIFO 0 each one slot. Reversal of the bits then maps FIFO 3 to the evenly distributed binary values 111, 011, 101 and 001, FIFO 2 to the evenly distributed binary values 110 and 010, and assigns FIFO 1 and FIFO 0 the values 100 and 000, respectively.

FIG. 7 is a flow chart for distributing access to a resource among a plurality of agents requesting access together with walk-through values that might result from six passes through the procedure. This embodiment of the invention accommodates a predetermined number of agents, with agents not making a request or unassigned slots being skipped. This latter provision may be useful in situations wherein a total normalized bandwidth requirement is not a whole power of two, i.e., falls between power of two values. In this situation, dummy time slots may be used to complete the total number of time slots up to a power of two value, with the unassigned dummy time slots being skipped. Alternatively, agents not requesting access to a resource or other service may be unmapped so that the mapping and corresponding allocation routine are dynamically updated to accommodate only devices having an outstanding request for access or service.

Upon entry, a register or binary counter is initialized to zero. The routine next determines if any devices are requesting service, e.g., access to a resource such as I/O. If a request is pending, the binary value stored in the counter is incremented and a value corresponding to a reversal of the bit values is obtained. (Note that alternative implementations may instead initialize the counter to −1 or delay counter incrementing until after a test is performed.) The reversed counter value is then matched with the agent assigned that value and a determination is made if that agent is requesting service as indicated by having its arbitration bit set. If the arbitration bit is not set, the routine loops back to again increment the counter value and test the associated arbitration bit to identify a pending request. Because the number of binary numbers assigned to a particular (requesting) device is proportionate to its normalized bandwidth and because these values are evenly distributed among the remaining numbers, each device is provided with equitable apportionment of resource access and bandwidth.

An example of an initial six passes through the routine with values generated is presented in the right portion of FIG. 7. Upon detection of a device requesting service (in this case, FIFO 1 and FIFO 3), the value stored in the binary counter is to "001" and the reversed bit sequence formed as $100_{base}$ or $4_{base10}$. Having previously assigned FIFO 3 the values $4-7_{base10}$, FIFO 3 is declared the arbitration winner and provided access to the subject resource. On the next iteration, assuming at least one of the devices is requesting service, the counter is again incremented resulting a bit reversed (and, in this case forward) count value of $010_{base2}$ or $2_{base10}$ However, because FIFO 2 assigned that value is not requesting service (as indicated by its arbitration bit not being set), no arbitration winner is declared and, instead, the routine skips back to increment the value stored in the counter. A bit reversal of the newly incremented count results in $110_{base2}$ or $6_{base10}$ with FIFO 3 again declared the winner. The next count increment results in a bit reversed value of $001_{base2}$ or $1_{base10}$, a value assigned to FIFO 1 so that it is declared the arbitration winner and provided access to the requested resource. The routine continues incrementing the binary count resulting in FIFO 3 next being declared a winner followed by a cycle skipping winner declaration caused by the corresponding device no having a set arbitration bit.

Although the implantation of FIG. 7 does not explicitly include a step of dynamically remapping to eliminate from a table of assignments binary values of those devices not having an outstanding request pending, this technique may be included instead or in addition to skipping values assigned to devices not requesting service. Thus, map logic block 305 of FIG. 3 may be configured to dynamically assign slots and corresponding binary values to only those devices requesting service. To the extent necessary or desirable, unused assignments resulting from completing the map to the next power of two may be skipped according to the routine depicted in FIG. 7.

In addition, although the present invention has been described in terms of using a binary bit reversal to evenly distribute agent allocations, other techniques such as a hash functions pseudo-random number generator, etc. may be used.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device for arbitrating access to a resource by a plurality of agents, comprising:
   map logic defining a plurality of consecutive time slots, a number of said time slots assigned to respective requesting ones of said agents in proportion to respective bandwidth parameters thereof;
   a register, wherein said register comprises a counter providing a repeating sequence of values, and wherein said counter is responsive to said map logic for skipping values corresponding to nonrequesting ones of said agents; and
   a selector responsive to said register for sequencing through said time slots and selecting respective ones of said requesting agents assigned to said time slots.

2. The device according to claim 1 wherein said map logic dynamically allocates said time slots to said requesting ones of said agents.

3. The device according to claim 1 wherein said sequence repeats in correspondence to a total number of time slots defined by said map logic.

4. The device according to claim 1 wherein said map logic evenly distributes said time slots assigned to respective ones of said agents over a total number of said consecutive time slots.

5. A method of arbitrating access to a resource by a plurality of agents, comprising the steps of:
   defining a plurality of consecutive access slots, a number of said access slots assigned to respective ones of said agents in proportion to respective bandwidth parameters thereof;
   periodically sequencing through said access slots; and
   selecting respective ones of said agents assigned to said access slots, wherein ones of said access slots assigned to respective ones of said agents are evenly distributed among all of said accuse slots.

6. The method according to claim 5 wherein each of said access slots is identified by a corresponding one of a monotonically increasing sequence of binary numbers and said map logic maps each of said binary numbers to a target binary number formed by reversing a bit order thereof.

7. The method according to claim 5 including a step of assigning each of said agents a consecutive sequence of binary numbers having a minimized distance between the most significant bits thereof.

8. A method according to claim 5 further comprising a step of associating each of said agents with a set of binary numbers corresponding to values obtained by reversing a bit order of respective ones of non-overlapping consecutive sequences of binary numbers, each of said sequences spanning a range proportionate to a bandwidth requirement of respective ones of said agents.

9. The method according to claim 5 further comprising a step of associating each of said agents with a set of binary numbers included within respective non-overlapping consecutive sequences of binary numbers, each of said sequences spanning a range proportionate to a bandwidth requirement of respective ones of said agents.

10. A device for arbitrating access to a resource by a plurality of agents, comprising:
    map logic defining a plurality of consecutive time slots, a number of said time slots assigned to respective requesting ones of said agents in proportion to respective bandwidth parameters thereof, wherein each of said requesting agents is associated with a consecutive sequence of binary numbers beginning with a binary number that is an integer multiple of a normalized bandwidth of the agent;
    a register; and
    a selector responsive to said register for sequencing through said time slots and selecting respective ones of said requesting agents assigned to said time slots.

11. The device according to claim 10 wherein each of said time slots is identified by a corresponding one of a monotonically increasing sequence of binary numbers and said map logic maps each of said binary numbers to a target binary number formed by reversing a bit order thereof.

12. The device according to claim 10 wherein each of said agents is associated with a set of binary numbers corresponding to values obtained by reversing a bit order of respective ones of non-overlapping consecutive sequences of binary numbers, each of said sequences spanning a range proportionate to a bandwidth requirement of respective ones of said agents.

13. The device according to claim 10 wherein each of said requesting agents is associated with a consecutive sequence of binary numbers having a minimized distance between the most significant bits thereof weighted from most to least significant.

14. A device for arbitrating access to a resource by a plurality of agents, comprising:
    map logic defining a plurality of consecutive time slots, a number of said time slots assigned to respective requesting ones of said agents in proportion to respective bandwidth parameters thereof, wherein each of said agents is associated with a set of binary numbers included within respective non-overlapping consecutive sequences of binary numbers, each of said sequences spanning a range proportionate to a bandwidth requirement of respective ones of said agents;
    a register; and
    a selector responsive to said register for sequencing through said time slots and selecting respective ones of said requesting agents assigned to said time slots.

* * * * *

UNITED STATES PATENT AND TRADEMARK OFFICE
CERTIFICATE OF CORRECTION

PATENT NO. : 6,594,718 B1
DATED : July 15, 2003
INVENTOR(S) : Sharon M. Ebner et al.

It is certified that error appears in the above-identified patent and that said Letters Patent is hereby corrected as shown below:

<u>Column 9,</u>
Line 64, delete "accuse" and insert therefore -- access --

Signed and Sealed this

Twelfth Day of October, 2004

JON W. DUDAS
*Director of the United States Patent and Trademark Office*